United States Patent
Bito et al.

(10) Patent No.: US 11,063,816 B2
(45) Date of Patent: Jul. 13, 2021

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventors: Koji Bito, Kanagawa (JP); Kosuke Kikushima, Kanagawa (JP); Naoto Kashiwagi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/591,691

(22) Filed: Oct. 3, 2019

(65) Prior Publication Data
US 2020/0313954 A1    Oct. 1, 2020

(30) Foreign Application Priority Data
Apr. 1, 2019    (JP) .............................. JP2019-069666

(51) Int. Cl.
*H04L 12/24*    (2006.01)
(52) U.S. Cl.
CPC ............ *H04L 41/069* (2013.01); *H04L 41/22* (2013.01)

(58) Field of Classification Search
None
See application file for complete search history.

(56) References Cited

U.S. PATENT DOCUMENTS

| 9,665,316 B2 | 5/2017 | Bito |
| 2005/0123137 A1* | 6/2005 | McCallum .............. G06F 21/10 380/255 |

FOREIGN PATENT DOCUMENTS

JP    2017-45115 A    3/2017

* cited by examiner

*Primary Examiner* — Scott B Christensen
(74) *Attorney, Agent, or Firm* — Oliff PLC

(57) ABSTRACT

An information processing device includes a storage unit, a controller, a storage processor, and a transmitter. When communication with a log management server is unavailable, the controller causes a log of an operation of storing or retrieving data with respect to a storage area on a network to be stored in the storage unit in association with the data. In a case in which the data stored in the storage unit is stored in the storage area and the log associated with the data exists, the storage processor performs a process of storing the log in the storage area in association with the data. In a case in which communication with the log management server is available and a log is stored in association with data in the storage unit, the transmitter transmits the log to the log management server.

19 Claims, 9 Drawing Sheets

FIG. 10

| DOCUMENT TRANSFER HISTORY | | | | |
|---|---|---|---|---|
| DO YOU WANT TO TRANSMIT THE FOLLOWING UNTRANSMITTED LOG TO THE SERVER? | | | | |
| TRAY NAME | TIME OF OPERATION | OPERATOR | OPERATION TYPE | DOCUMENT NAME |
| TRAY A | 03/01/2019 13:15 | SATOH | STORE | ESTIMATE A |
| TRAY A | 03/01/2019 13:16 | SUZUKI | RETRIEVE | ESTIMATE A |
| TRAY B | 03/01/2019 13:16 | SUZUKI | STORE | ESTIMATE A |
| TRAY B | 03/01/2019 13:18 | TANAKA | RETRIEVE | ESTIMATE A |
| TRAY C | 03/01/2019 13:19 | TANAKA | STORE | ESTIMATE A |

YES    NO

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-069666 filed Apr. 1, 2019.

BACKGROUND

(i) Technical Field

The present disclosure relates to an information processing device and a non-transitory computer readable medium.

(ii) Related Art

There exist systems that achieve a workflow by having multiple users transfer data such as documents through several storage areas provided on a network.

In the system disclosed in Japanese Unexamined Patent Application Publication No. 2017-45115, when a user having a first role performs a process by activating a tool corresponding to document data, the tool being the user's own terminal, a result of processing the document data is stored in a storage area corresponding to the tool inside a server device on a network. Subsequently, the display of a desktop metaphor of the storage area displayed on the screen of a terminal of a user having a second role is changed to indicate that new document data has arrived. If the user having the second role retrieves the document data from the storage area, performs a process using a different tool, and stores the processing result, the processing result is stored in a different storage area inside the server device. Through this storage area, the document data of the processing result is transferred to a user having a third role. Also, in the system disclosed in JP-A-2017-45115, a list of tools that have completed process in the workflow is included as attribute information of the document data, Additionally, when a user opens the document data, a screen is displayed indicating which tools have completed processes, and which tool is to execute the next process (see paragraph 0078 for example). Also, JP-A-2017-45115 describes how the terminal of each user transmits log information about processes executed with respect to the document data (that is, a processing history) to the server device, and the server device records the log information. By referencing the log information group recorded in the server device, the server device and the terminal of each user obtain information indicating the progress of processing for each individual document (see paragraphs 0092 to 0097 for example).

SUMMARY

In a system in which multiple users transfer data through one or more storage areas on a first network, consider a case in which log information about operations performed on the data is collected from the information processing device of each user and managed in a server on a second network. One example of such a system is a system in which log information about operations related to the transfer of data among users on a local area network of a client company is collected in a server on the Internet. In such a system, services using the collected log information are provided to users by the server, for example.

In such a system, when data is stored or retrieved with respect to a storage area from an information processing device of a user on the first network, if the information processing device is unable to communicate with the server, log information about the operations may not be transmitted to the server. If the log information is not transmitted to the server, the services that the server provides to users will be degraded to the extent of the loss of log information. To transmit the log information to the server, it may be necessary to put the information processing device in a communicable state with the server.

Aspects of non-limiting embodiments of the present disclosure relate to a mechanism enabling a log of operations about the storage or retrieval of data with respect to a storage area performed by an information processing device to be transferred to a log management server, without putting the information processing device in a communicable state with the log management server.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a storage unit, a controller, a storage processor, and a transmitter. When communication with a log management server is unavailable, the controller causes a log of an operation of storing or retrieving data with respect to a storage area on a network to be stared in the storage unit in association with the data. In a case in which the data stored in the storage unit is stored in the storage area and the log associated with the data exists, the storage processor performs a process of storing the log in the storage area in association with the data. In a case in which communication with the log management server is available and a log is stored in association with data in the storage unit, the transmitter transmits the log to the log management server.

BRIEF DESCRIPTION OF THE DRAWINGS

An exemplary embodiment of the present disclosure will be described in detail based on the following figures, wherein:

FIG. 10 is a diagram illustrating an example of a screen querying whether to an transmit untransmitted log.

DETAILED DESCRIPTION

Figure 1:
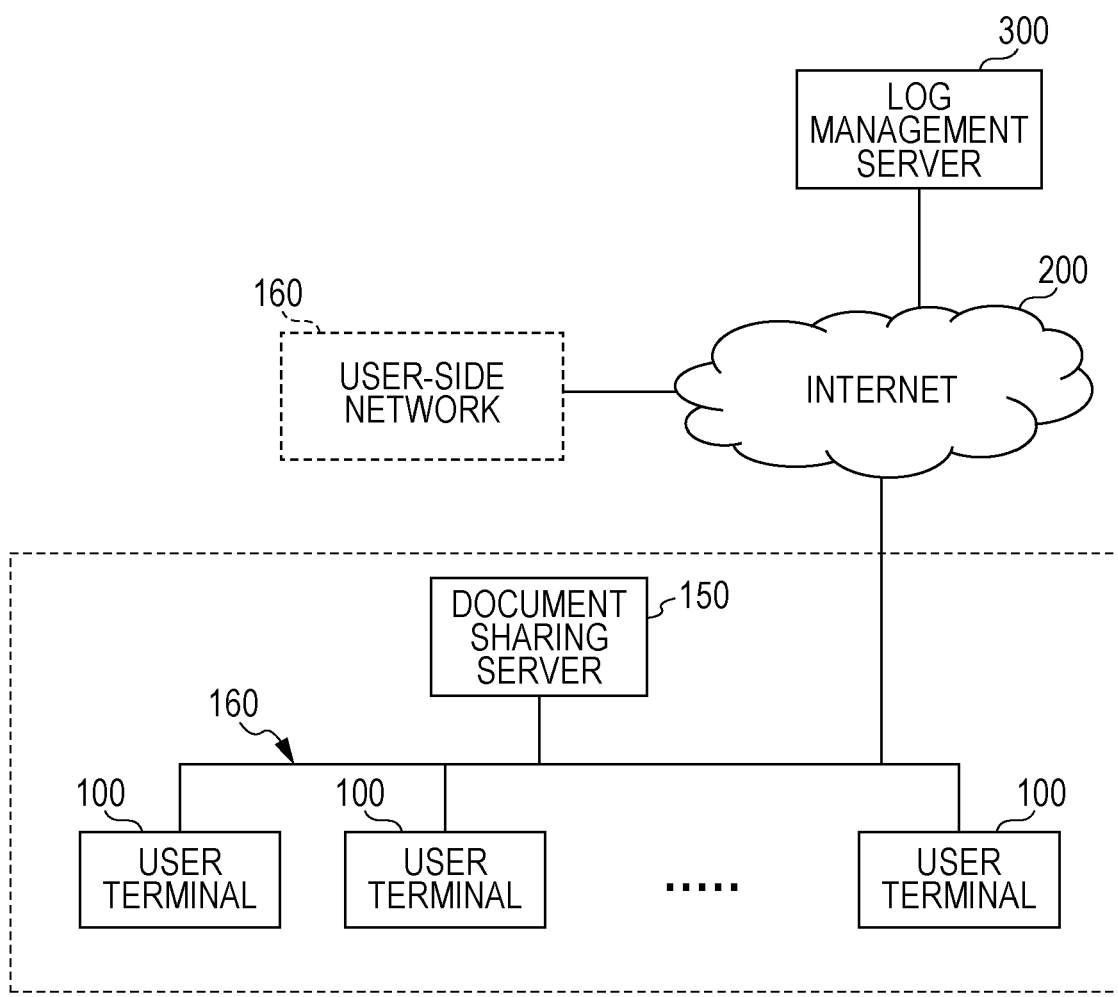
FIG. 1 is a diagram illustrating an example of the configuration of a system that transfers and tracks the transfer of documents among users.

FIG. 1 will be referenced to describe the configuration of a system that transfers and tracks the transfer of documents among users.

The system includes multiple user terminals 100 and a document sharing server 150, which are connected to a user-side network 160, and a log management server 300 accessible from the user-side network 160 over the Internet 200. The user-side network 160 is isolated from the Internet 200 by a firewall for example.

The user-side network 160 is a computer network of user-side organization that receives services from the log management server 300. For example, the user-side network 160 is structured as a local area network, an intranet, or an extranet. The user terminals 100 are computer terminals used by each user belonging to the user-side organization, and are personal computers for example. The document sharing server 150 provides an environment for sharing documents among users inside the user-side organization. In the document sharing server 150, it is possible to set up one or more logical storage areas called "trays". A tray is capable of storing one or more documents. Note that in this specification, a "document" refers to data in some kind of data format, and the data format is not particularly limited. Typically, documents are files. Also, a tray is one example of a networked storage area from the perspective of the user terminals 100.

A user inside the user-side organization is able to store a document from one's own user terminal 100 in a tray in the document sharing server 150, or retrieve a document in a tray to one's own user terminal 100. A document "retrieved" from a tray disappears from the tray, and is moved to the user terminal 100 of the user giving the instruction to retrieve the document. By having one user store a document in a tray and having a different user retrieve the document from the tray, a transfer of the document from the former to the latter is established. By using multiple trays, such as by transferring a document from a first user to a second user through a first tray, and transferring the document from the second user to a third user through a second tray, it is possible to transfer documents among three or more users. If the users who are able to store documents in each tray and users who are able to retrieve documents from each tray are limited by setting access rights to each tray for each user for example, a flow of document transfer among users is configured. By having a user perform predetermined work on a document retrieved from a tray and then store the document in the next tray to transfer the document to the next user in this flow, a workflow is formed.

Note that the trays of the document sharing server 150 are not only capable of the document retrieval described above, but are also capable of accepting an operation to download a document to a user terminal while leaving the document in the tray.

In each user terminal 100, an application that accepts operations for storing documents in the trays of the document sharing server 150 and retrieving documents from the trays is installed. This application is called a document handling application. This application will be described more fully later.

The log management server 300 on the Internet 200 records a log of operations performed on documents in the user terminals 100 on the user-side network 160, and more particularly, a log of document storage and retrieval operations with respect to the trays in the document sharing server 150. Additionally, on the basis of the recorded log about a document, the log management server 300 provides users with information about the progress and course of the transfer of the document, such as which user is currently in possession of the document, when and how the document was received and by whom, or which tray the document is stored in. The log management server 300 may also include a function of aggregating logs for a large number of documents to perform analysis, such as calculating the average time spent on workflow processes for the documents and specifying which documents took a relatively long time, and providing analysis results to users. Note that the basic functions of the log management server 300 may be similar to those disclosed in JP-A-2017-45115.

The log management server 300 provides a service of saving and aggregating logs of operations on documents to multiple user-side networks 160. The log management server 300 may also have a function of analyzing saved logs and providing the results of the analysis to the user side.

To record logs in the log management server 300, every time a user performs an operation such as storing or retrieving a document, the document handling application of each user terminal 100 sends a log of the operation to the log management server 300 over the Internet 200. The log sent at this time includes fields such as the date and time of the operation, the operator, the type of the operation, the document name of the document on which to perform the operation, and identification information about the tray targeted for storage or retrieval, for example.

Figure 2:
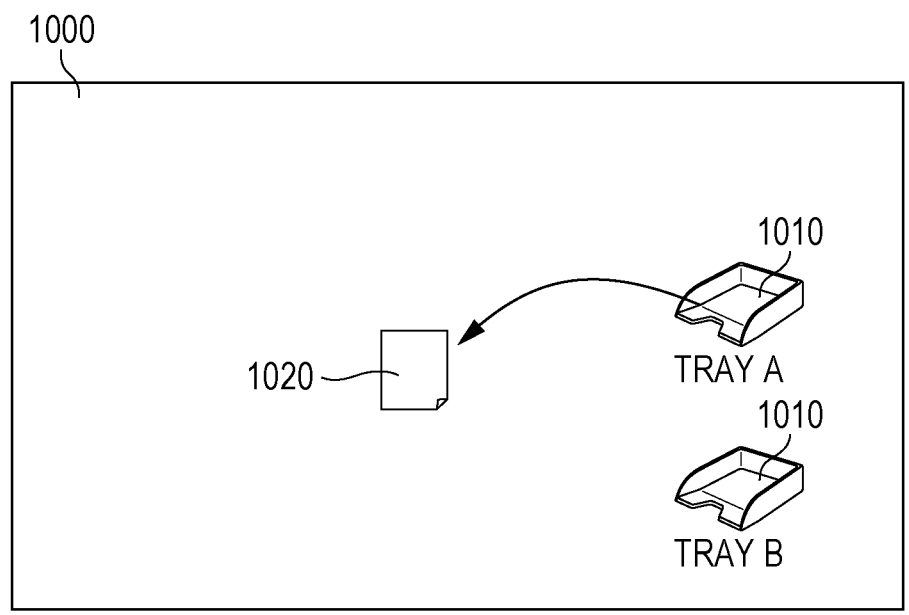
FIG. 2 is a diagram explaining an operation of retrieving a document from a tray on an operation screen of a document handling application.
Figure 3:
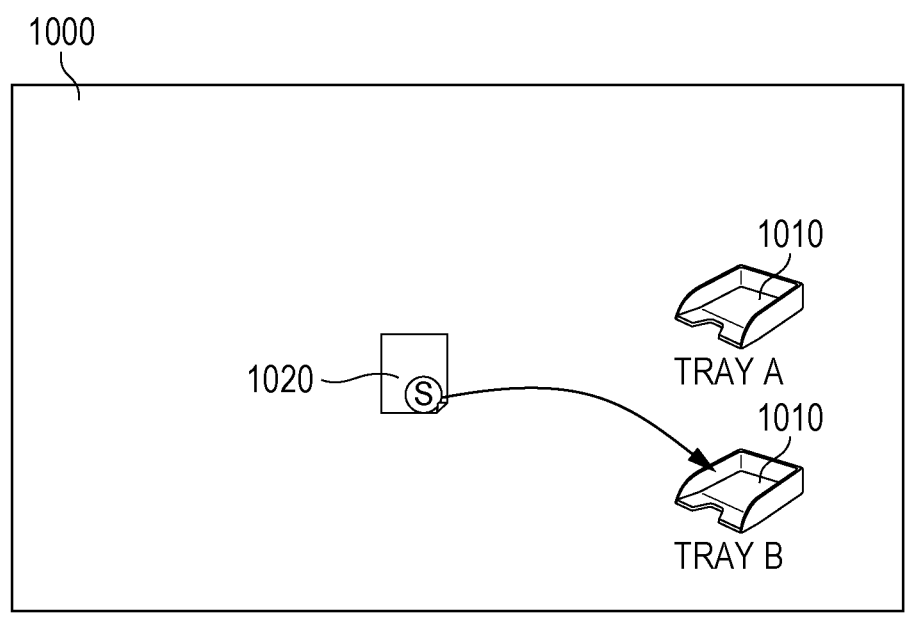
FIG. 3 is a diagram explaining an operation of storing a document in a tray on an operation screen of the document handling application.

FIGS. 2 and 3 illustrate examples of screen displays provided by the document handling application of the user terminals 100. As exemplified in FIG. 2, on a desktop screen 1000 of one of the user terminals 100, several tray icons 1010 representing trays accessible by the user using the user terminal 100 are displayed. The individual tray icons 1010 are associated with trays in the document sharing server 150 corresponding to the tray icons 1010. For example, the document handling application holds, in association with the tray icons 1010, information for accessing the trays in the document sharing server 150 that correspond to the tray icons 1010. The information is information indicating the location of each tray on the network, such as a URL or address information, for example. Also, in the case in which the presentation of authentication information such as a password is demanded to access a tray, the document handling application manages the authentication information in association with the corresponding tray icon 1010. Near each tray icon 1010 on the desktop screen 1000, a name expressing the tray corresponding to the tray icon 1010 is displayed in association with the tray icon 1010. Also, each tray icon 1010 may be accompanied by a display indicating the number of unread documents in the corresponding tray in the document sharing server 150, a display indicating that a new document has arrived in the tray, or the like.

By performing an operation on one of the tray icons 1010, the user is able to retrieve a document from the tray corresponding to the tray icon 1010 to the user terminal 100. For example, if the user performs a double-click operation or the like to open the tray icon 1010 labeled "Tray A", a window illustrating list of documents in the tray named Tray A in the document sharing server 150 is displayed on the desktop screen 1000 of the user terminal 100. By performing a drag-and-drop operation to move a document 1020 inside the window to the desktop screen 1000, the document 1020 is retrieved, from the tray to the user terminal 100. Note that retrieval destination of a document from a tray is not limited to the desktop screen. Instead, for example, the document 1020 may be retrieved into a window for document handling generated by the document handling application. By opening the document 1020 retrieved to the user terminal 100 with the document handling application for example, the content of the document 1020 is displayed in a viewer window. By operating the document handling application, the user is able to view the document 1020 and also make edits such as filling in information or applying a seal. In the example of FIG. 3, a seal has been applied to the document.

When the user finishes work such as viewing and editing the retrieved document 1020, the user performs a drag-and-drop operation as illustrated in FIG. 3 for example to place the document 1020 into the tray icon 1010 representing the next tray (named "Tray B") in the flow. The operation is an operation of storing the document 1020 in Tray B in the document sharing server 150.

In each of the operation of retrieving a document from a tray illustrated in FIG. 2 and the operation of storing a document in a tray illustrated in FIG. 3, the document handling application sends a log of the operation to the log management server 300 over the Internet 200. However, such transmission of a log is unsuccessful in a number of cases. One example of such a case is when the user terminal 100 is unable to connect to the Internet 200 due to a network outage.

Also, depending on the organization, in some cases a connection to the Internet 200 may not be authorized for a user terminal 100 located in a specific department or a specific location for security reasons. Such a user terminal 100 is capable of accessing the document sharing server 150 on the user-side network 160 to store and retrieve documents with respect to trays, but is incapable of transmitting a log of the storage and retrieval operations and the like to the log management server 300. In the case in which a user terminal 100 unable to transmit a log to the log management server 300 exists in this way, the flow of document transfer may not be recorded in the log management server 300 for a workflow that includes the user who uses that user terminal 100.

The user terminal 100 according to the exemplary embodiment, which is one example of an information processing device according to an exemplary embodiment of the present disclosure, provides a mechanism whereby even if the user terminal 100 is unable to send a log to the log management server 300, a log of operations on one or more documents by the user terminal 100 is conveyed to the log management server 300.

Figure 4:
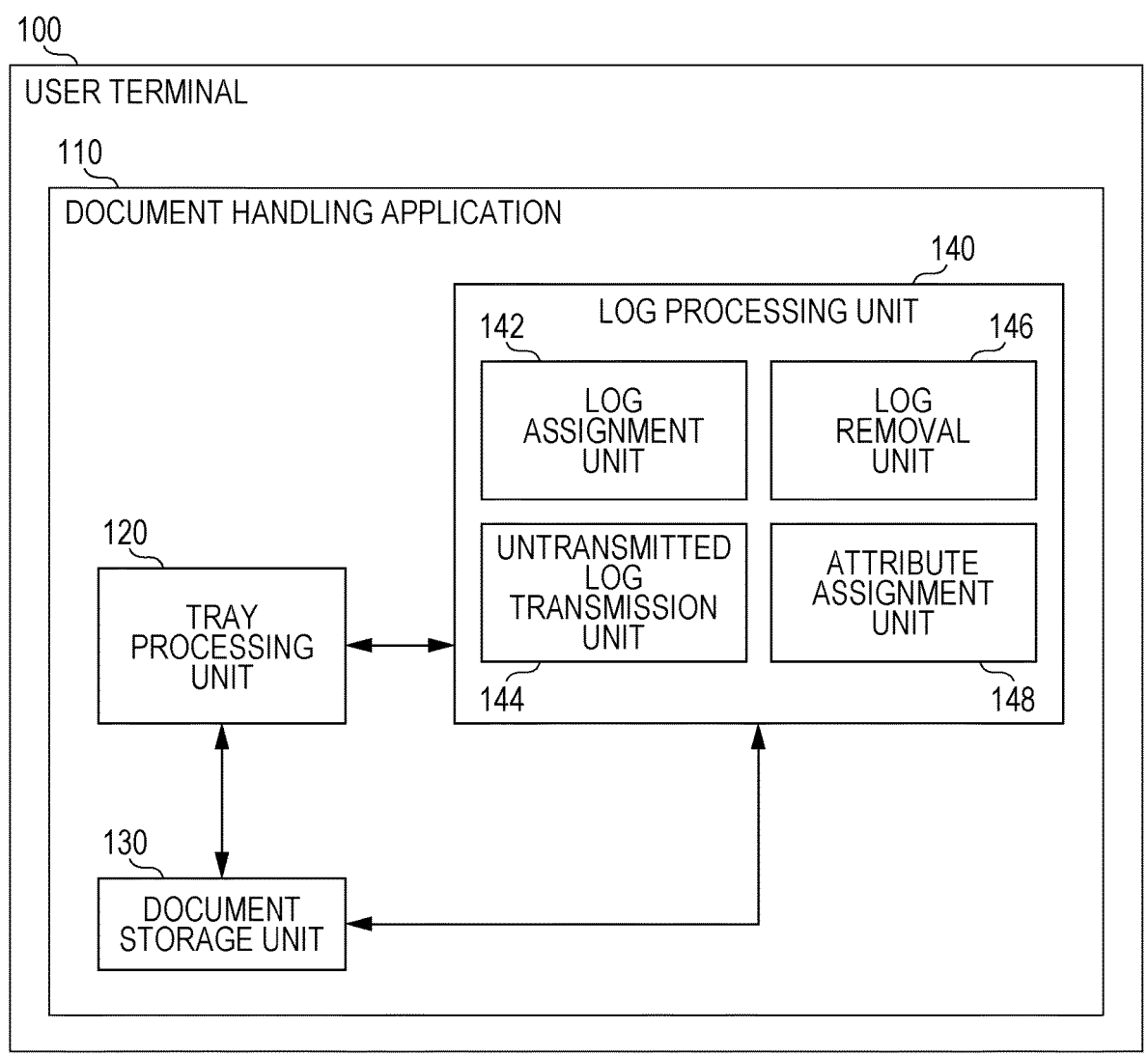
FIG. 4 is a diagram illustrating an example of a functional configuration of the document handling application installed in a user terminal.

FIG. 4 illustrates an example of a functional configuration of a document handling application 110 installed in the user terminal 100 according to the exemplary embodiment. The document handling application 110 illustrated in the diagram is executed by a computer built into a user terminal, thereby causing the document handling application 110 to function as a tray processing unit 120, a document storage unit 130, and a log processing unit 140.

The tray processing unit 120 displays the tray icons 1010 on the desktop screen 1000, and executes processes corresponding various operations from the user with respect to the tray icons 1010. For example, if an operation of dropping the icon of the document 1020 onto one of the tray icons 1010 is performed, the tray processing unit 120 executes a process of storing the document 1020 in the tray corresponding to the tray icon 1010 in the document sharing server 150. Also, in response to an operation of opening one of the tray icons 1010, the tray processing unit 120 displays a window indicating a list of documents inside the corresponding tray, and in response to a retrieval operation performed by the user on a document on the list, the tray processing unit 120 retrieves the document from the tray.

Also, the tray processing unit 120 cooperates with the log processing unit 140 to perform a control process that keeps document retrieval and storage processes from being performed without a log being recorded. This control process will be described in detail later.

The document storage unit 130 is a storage unit that stores documents to be processed by the document handling application 110. The document storage unit 130 stores documents that the tray processing unit 120 has retrieved or downloaded from the document sharing server 150. Also, the document storage unit 130 stores documents resulting from the user performing operations such as editing on such retrieved or downloaded documents. Also, the document storage unit 130 stores a log assigned to a document by the log processing unit 140 described later, in association with the document (details will be described later). For example, the document storage unit 130 is a memory area reserved by the document handling application 110 in read-only memory inside the user terminal 100, a file system of the user terminal 100, or the like. The document storage unit 130 is one example of a storage unit that stores data.

The log processing unit 140 executes a process for conveying, to the log management server 300, a log of operations performed on a document by a user, such as storage of the document in a tray and retrieval of the document from a tray. In addition to the basic function of transmitting a log of operations to the log management server 300 when operations are performed on a document, the log processing unit 140 is provided with the function modules of a log assignment unit 142, an untransmitted log transmission unit 144, a log removal unit 146, and an attribute assignment unit 148.

In the case in which a log is not successfully transmitted to the log management serve 300, the log assignment unit 142 executes a process for assigning the log to the document on which the operation corresponding to the log was performed. Assigning a log to a document refers to associating the log to the document. There are a variety of conceivable methods of assigning a log to a document. For example, there is a method of writing the log into attribute or property information inside the document file. In addition, the log may also be prepared as a separate file associated with the document file. In this case, the document file and the log file contain information for associating with each other (for example, the same identification information). The log assignment unit 142 is one example of a controller that causes a log of a data storage or retrieval operation to be stored in the storage unit in association with the data.

Also, the log assignment unit 142 has a function of displaying a user interface (UI) screen for log assignment on the user terminal 100, and receiving user input with respect to the screen.

When the log management server 300 is accessible, that is, when communication with the log management server 300 is available, the untransmitted log transmission unit 144 checks whether a log is assigned to a document stored in the document storage unit 130, and if a document with an assigned log exists, the untransmitted log transmission unit 144 transmits the log to the log management server 300. In the case in which a log is assigned to a document, that is, if the log is contained in the attribute information of the document for example, the log has not been transmitted to the log management server 300 yet. Accordingly, if the log management server 300 is accessible, the untransmitted log transmission unit 144 transmits the log to the log management server 300. The untransmitted log transmission unit 144 is one example of a transmitter that transmits a log stored in the storage unit in association with data to the log management server.

A log assigned to a document includes one or more log records. A log record is log information generated by an individual operation, and includes fields regard the operation such as the date and time of the operation, the operator, the type of the operation, the document name of the document on which to perform the operation, and identification information about the tray targeted for storage or retrieval. In the case in which multiple operations are performed on a document during a period in which the user terminal 100 is unable to access, or in other words communicate with, the log management server 300, log records for each of these operations are included in the log assigned to the document.

In the case in which the untransmitted log transmission unit 144 has transmitted a log assigned to a document to the log management server 300, the log removal unit 146 removes the log. With this arrangement, the document no longer has an assigned log. Additionally, the log removal unit 146 may also remove the log in the case in which the user gives an instruction not to transmit the log assigned to a document to the log management server 300.

In the case in which the user inputs an instruction indicating not to transmit a log assigned to a document to the log management server 300, the attribute assignment unit 148 adds an attribute indicating that log assignment is unnecessary to the attribute information of the document. With this arrangement, even if future operations such as storage and retrieval are performed on the document, a log of the operations is not assigned to the document, nor is the log transmitted to the log management server 300. The user gives such an instruction when the user judges that the log assigned to the document has little or no value in being accumulated in the log management server 300, and logs of operations produced in the future similarly would have little or no value in being accumulated in the log management server 300. This point will be described in detail later.

Figure 5:
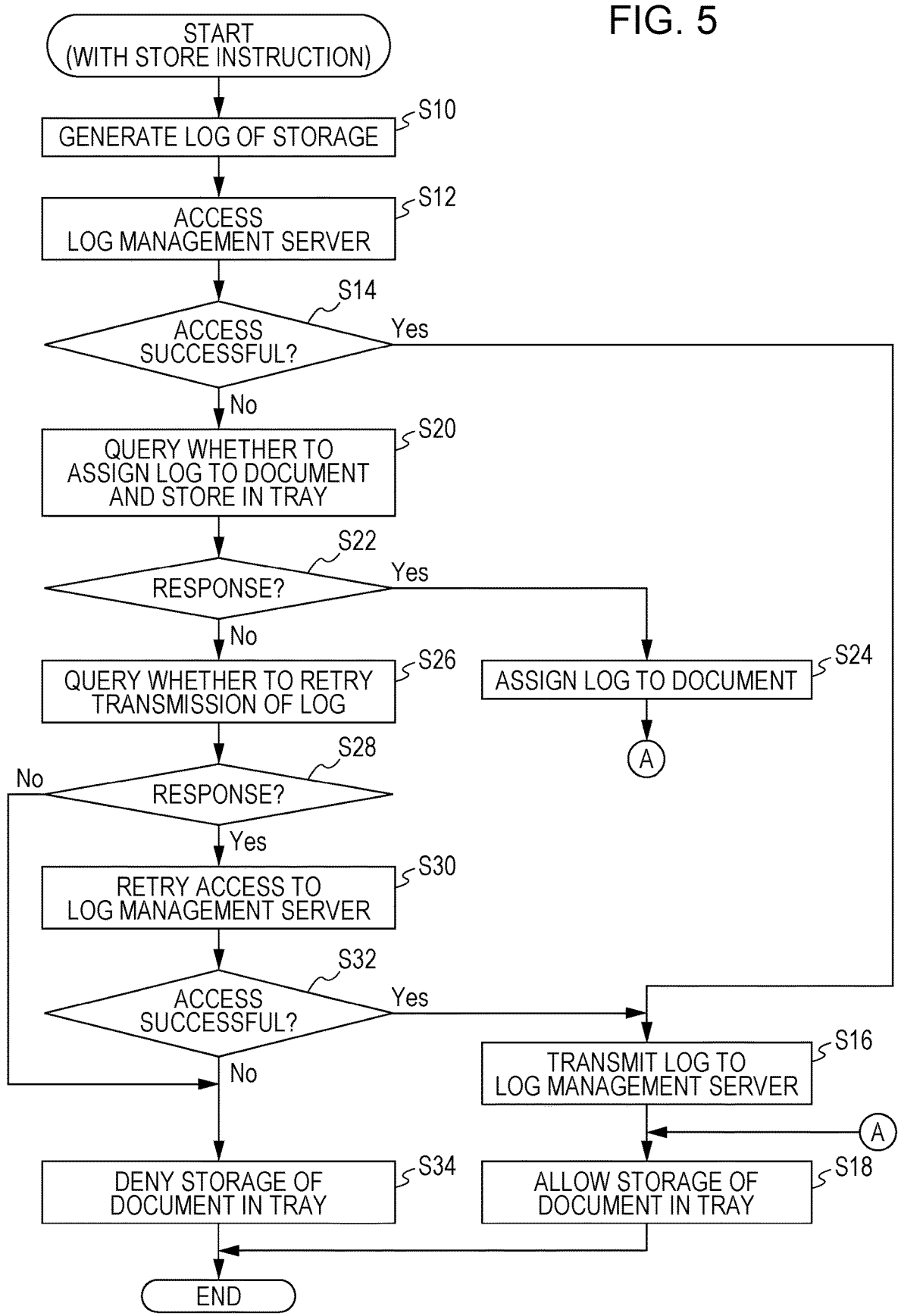
FIG. 5 is a diagram illustrating an example of a processing procedure executed by a log processing unit when an operation of storing a document in a tray is performed.

Next, FIG. 5 will be referenced to describe an example of a processing procedure executed by the log processing unit 140 and the tray processing unit 120 in the case in which the user gives an instruction to tore a document in the user terminal 100 (that is, a document stored in the document storage unit 130) in a tray.

The instruction to store the document in the tray is given by dragging and dropping the document 1020 onto one of the trays 1010 on the desktop screen 1000, for example. Before storing the document in the tray, the tray processing unit 120 detecting the instruction reports information about the store instruction to the log processing unit 140, and requests permission to store. At this time, the information reported to the log processing unit 140 by the tray processing unit 120 includes the value of each field to be included in the log to record. In other words, the reported information includes identification information of the user who gave the instruction, identification information of the document to be stored (for example, the document name), the type of operation according to the instruction (in this case, storage), identification information of the tray on which to perform the operation, and the date and time when the instruction was given. The tray processing unit 120 defers storing the document in the tray until permission to store is obtained from the log processing unit 140.

The log processing unit 140 receiving the request for storage permission executes the procedure illustrated in FIG. 5. First, the log processing unit 140 generates a log of the storage operation on the basis of the information received from the tray processing unit 120 (S10). The log includes the date and time of the operation, a user ID of the operator, the operation type (in this case, "storage"), identification information of the document on which to perform the operation (for example, the document name), and identification information of the tray on which to perform the operation (for example, the tray name). Next, the log processing unit 140 attempts to access, or in other words communicate with, the log management server 300 (S12). The log processing unit 140 determines whether or not the log management server 300 is accessed successfully (S14), and if access is successful, the log processing unit 140 transmits the log generated in S10 to the log management server 300 (S16), With this arrangement, the log is saved in the log management server 300. Also, the log processing unit 140 allows the tray processing unit 120 to store the document (S18). When permission is granted, the tray processing unit 120 executes the deferred storage process. With this arrangement, the document to be stored according to the instruction given by the user is stored in the tray indicated as the storage location. With this arrangement, the log process elated to a storage operation ends.

Figure 6:
FIG. 6 is a diagram illustrating an example of a screen displayed when a storage operation log is not successfully transmitted to a log management server.

In S14, in the case of determining that the log management server 300 is not accessed successfully, the log processing unit 140 displays a screen on the user terminal 100 querying whether to assign the log to the document (S20). An example of a query screen 2000 displayed at this time illustrated in FIG. 6. On the query screen 2000, the query message "The log could not be transmitted to the server because of a network issue. Do you want to assign a log to the document? If you press 'Yes', a log will be assigned to the document and stored in the tray." and a button group for inputting a Yes" or "No" response to the query are displayed. The log processing unit 140 determines whether the user's response to the query is "Yes" or "No" (S22).

If the response input by the user with respect to the query is "Yes", the log assignment unit 142 assigns the log generated in S10 to the document on which to perform the storage operation in the document storage unit 130 (S24). The button "Yes" with respect to the query of whether or not to assign the log on the screen 2000 is one example of a choice from among choices selectable by the user, the choice being to store a log in association with data (that is, a document) in the storage unit (that is, the document storage unit 130) while communication with the log management server is unavailable.

In this step, the log assignment unit 142 adds data of the log to data inside a log field in the attribute information of the document inside the document storage unit 130, or adds the data of the log to data inside a log file associated with the document, for example. In the case in which data exists inside the log field or the log file, the current log is added after the one or more logs included in the data. After adding the log, the log processing unit 140 allows the tray processing unit 120 to store the document (S18). With this arrangement, the log process related to a storage operation ends. In this case, the tray processing unit 120 receiving permission stores the document, together with the assigned log, in the indicated tray. In the case in which the assigned log is included in the attribute information of the document, if the document is stored in the tray, the log is also automatically stored in the tray together with the document. In the case in which the log file holding the assigned log is separate from the document file, the tray processing unit 120 checks whether or not a log file corresponding to the document exists, and if a corresponding log file exists, the tray processing unit 120 stores the log file together with the document in the tray. In this way, the function by which the tray processing unit 120 stores a log assigned to a document together with the document is one example of a storage processor that performs a process of storing a log in association with data in a storage area.

In this way, in the case in which a log is not successfully transmitted to the log management server 300 when an operation of storing a document in a tray is performed, the log processing unit 140 assigns the log to the document. Conversely, when the log is successfully transmitted to the log management server 300, the log is not assigned to the document.

In the case in which the user's response to the query in S20 is "No", the log processing unit 140 queries the user about whether to retry transmitting the log to the log management server 300 (S26). This is a process that accounts for the case in which, at the time of attempting to access the log management server 300 in S12, the user coincidentally was unable to access the Internet or was simply in a location with an unstable Internet connection. In other words, in the case in which the user coincidentally had turned off the wireless connection of the user terminal 100 or the Internet connection at the time of S12, it is possible to access the log management server 300 with a simple operation of turning on the wireless connection or the like. Also, in the case in which the user coincidentally was in a location inside an office where an Internet connection is unavailable or a location where the wireless connection is unstable, it may be possible to access the log management server 300 by moving away from that location in some cases. In cases like the above, it is beneficial to access the log management server 300 and transmit the log. Accordingly, the user is queried about whether to retry log transmission.

Figure 7:
FIG. 7 is a diagram illustrating an example of a screen displayed when a user chooses not to assign a log to a document.

An example of a query screen 2100 that the log processing unit 140 displays on the screen of the user terminal 100 for this query is illustrated in FIG. 7. On the query screen 2100, the query message "Do you want to resend the log to the server? If you press 'Yes', the log will be transmitted to the server. If you press 'No', storage in the tray will be canceled.", and a button group for inputting a "Yes" or "No" response to the query are displayed. The log processing unit 140 determines whether the user's response to the query is "Yes" or "No" (S28). If the user is able to address the state of being unable to access to the log management server 300, the user performs work to address the inaccessible state, and then presses the "Yes" button on the query screen 2100 in FIG. 7. In other words, the "Yes" button on the screen 2100 is one example of a choice from among choices selectable by the user, the choice being to put the information processing device (of which the user terminal 100 is one example) in a communicable state with the log management server.

If the response input by the user in response to the query is "Yes", the log processing unit 140 retries accessing the log management server 300 (S30). If the access is successful as a result (that is, if the determination result of S32 is Yes), the log processing unit 140 transmits the log to the log management server 300 (S16), and allows the tray processing unit 120 to store the document (S18).

In the case in which accessing (in other words, communicating with) the log management server 300 is unsuccessful in the retry of S30 (if the determination result of S32 is No), or in the case in which the user's response to the query in S26 is "No", the log processing unit 140 denies the request from the tray processing unit 120 (S34). In this case, the tray processing unit 120 returns the document 1020 that was dropped onto one of the tray icons 1010 back to the desktop screen 1000, without storing the document 1020 in a tray. Also, the tray processing unit 120 displays an error screen presenting a message indicating that the document will not be stored in the tray unless the log is recorded, for example. With this arrangement, the log process related to a storage operation ends.

In S24 of the procedure of FIG. 5, the log assignment unit 142 may also encrypt the log before assigning the log to the document. If the log assigned to the document is encrypted, the content of the log will not be revealed to a third party even in cases where the log is leaked. In the encryption, the log is encrypted using a public key of the log management server 300, for example. As another example, an encryption key may be shared by a group of users who transfer documents through a predetermined tray group, and the log may be encrypted using the encryption key.

Figure 8:
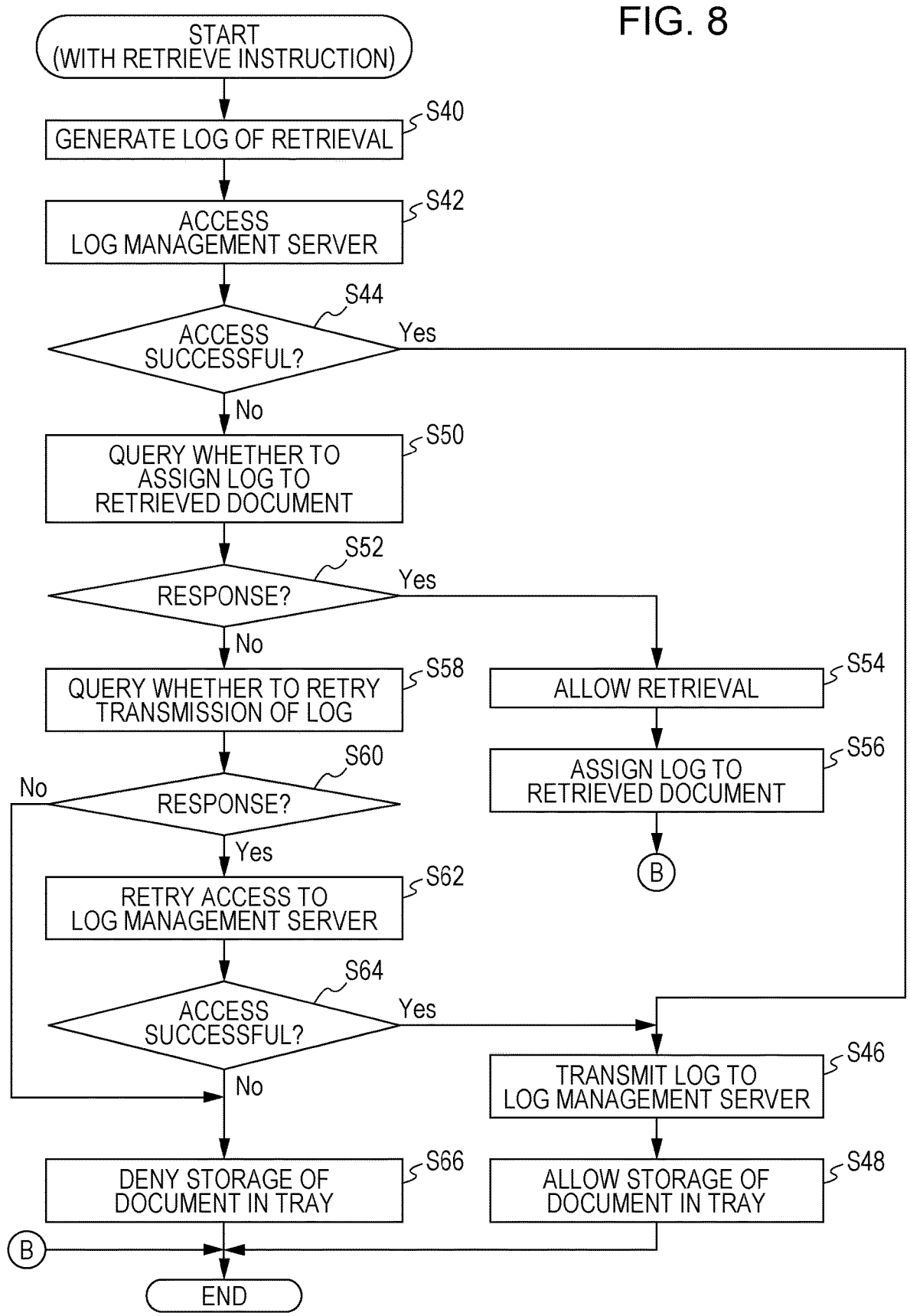
FIG. 8 is a diagram illustrating an example of a processing procedure executed by a log processing unit when an operation of retrieving a document from a tray is performed.

Next, FIG. 8 will be referenced to describe an example of a processing procedure executed by the log processing unit 143 and the tray processing unit 120 when the user gives an instruction to retrieve a document from a tray in the document sharing server 150.

In the case of retrieving a document from a tray, the user performs an operation of opening (by double-clicking for example) the tray icon 1010 corresponding to the tray on the desktop screen 1000, and selects the document from a list of documents inside the tray displayed in response, for example. Subsequently, the user selects "Retrieve" from a menu. Before retrieving document from the tray, the tray processing unit 120 detecting such a retrieval operation reports information about the retrieve instruction to the log processing unit 140, and requests permission to retrieve. The information that the tray processing unit 120 reports to the log processing unit 140 at this time includes the value of each field to be included in the log to record, namely, information such as identification information of the user who gave the instruction, identification information of the document to be retrieved, the type of operation according to the instruction (in this case, retrieval), identification information of the tray on which to perform the operation, and the date and time when the instruction was given. The tray processing unit 120 defers retrieving the document from the tray until permission to retrieve is obtained from the log processing unit 140.

The log processing unit 140 receiving the request for retrieval permission executes the procedure illustrated in FIG. 8. First, the log processing unit 140 generates a log of the retrieval operation on the basis of the information received from the tray processing unit 120 (S40). The log includes the date and time of the operation, the user ID of the operator, the operation type (in this case, "retrieval"), identification information of the document on which to perform the operation, and identification information of the tray on which to perform the operation. Next, the log processing unit 140 attempts to access the log management server 300 (S42). The log processing unit 140 determines whether or not the log management server 300 is accessed successfully (S44), and if access is successful, the log processing unit 140 transmits the log generated in S40 to the log management server 300 (S46). With this arrangement, the log is saved in the log management server 300. Also, the log processing unit 140 allows the tray processing unit 120 to retrieve the document (S48). When permission is granted, the tray processing unit 120 executes the deferred retrieval process. With this arrangement, the document to retrieve according to the instruction from the user is moved from the tray into the document storage unit 130 of the user terminal 100. With this arrangement, the log process related to a retrieval operation ends.

In S44, in the case of determining that the log management server 300 is not accessed successfully, the log processing unit 140 displays a screen on the user terminal 100 querying whether to assign the log to the document (S50). The query screen displayed at this time may be similar to the screen 2000 exemplified in FIG. 6. The log processing unit 140 determines whether the user's response to the query is "Yes" or "No" (S52).

If the response input by the user in response to the query is "Yes", the log processing unit 140 allows the tray processing unit 120 to retrieve the document (S54). The tray processing unit 120 receiving permission executes the deferred retrieval process. With this arrangement, the document to retrieve according to the instruction from the user is retrieved from the tray and stored in the document storage unit 130 of the user terminal 100. At this time, in the case in which a log is assigned to the document in the tray, the tray processing unit 120 also retrieves the log together with the document. In the case in which the assigned log is included in the attribute information of the document, when the document is retrieved in the tray, the log is also automatically retrieved together with the document and moved to the user terminal 100. In the case in which the log file holding the assigned log is separate from the document file, the tray processing unit 120 checks whether or not a log file corresponding to the document exists in the tray, and if a corresponding log file exists, the tray processing unit 120 retrieves the log file together with the document from the tray.

After the tray processing unit 120 receives permission in S54 and retrieves the document from the tray, the log assignment unit 142 assigns the log generated in S40 to the document inside the document storage unit 130 (S56). In the case in which a log is already assigned to the document, the log assignment unit 142 adds the log generated in S40 to the data of the preexisting log. In other words, the preexisting log data includes a log of a storage operation performed by a different user who stored the document in the tray for example, and the log of the current retrieval operation is added to this data. According to S56, the log process related to a retrieval operation ends.

In the case in which the user's response to the query in S50 is "No", the log processing unit 140 queries the user about whether to retry transmitting the log to the log management server 300 (S58). This is for the same purpose as the query in S26 of the procedure in FIG. 5, and a screen for this query may be similar to the one exemplified in FIG. 7.

The log processing unit 140 determines whether the user's response to the query is "Yes" or "No" (S60). If the response input by the user in response to the query is "Yes", the log processing unit 140 retries accessing the log management server 300 (S62). If the access is successful as a result (that is, if the determination result of S64 is Yes), the log processing unit 140 transmits the log to the log management server 300 (S46), and allows the tray processing unit 120 to retrieve the document (S48).

In the case in which accessing the log management server 300 is unsuccessful in the retry of S62 (if the determination result of S64 is No) or in the case in which the user's response to the query in S60 is "No", the log processing unit 140 denies the request from the tray processing unit 120 (S66). In the case, the tray processing unit 120 does not retrieve the document from the tray, and displays an error screen presenting a message indicating that the document will not be retrieved from the tray unless the log is recorded, for example. With this arrangement, the log process related to a retrieval operation ends.

As the above description demonstrates, the log assigned to the document (that is, stored in association with the document) by a first user terminal 100 because of an unsuccessful transmission to the log management server 300 is stored in the tray of the document sharing server 150 together with the document. Subsequently, the log together with the document are retrieved from the tray to a second user terminal 100. In the case in which the second user terminal 100 is also unable to access the log management server 300, a log of the operation such as a retrieval operation performed by the second user terminal 100 is assigned to the document. In other words, the log is added to the data of the log already assigned to the document. In this way, while the document is being transferred through a tray group between user terminals 100 unable to access the log management server 300, logs of operations such as retrieval and storage performed by these user terminals 100 are successively added to the log assigned to the document.

Considered from a different perspective, the logs assigned to the document are untransmitted logs not yet transmitted to the log management server 300 from among the logs of operations that have been performed on the document. In the case in which a user terminal 100 retrieving the document with an assigned log in the tray is able to access the log management server 300, the untransmitted log transmission unit 144 in the user terminal 100 transmits the log to the log management server 300. Also, for a user terminal 100 that retrieved a document from a tray and assigned a log of the retrieval to the document because accessing the log management server 300 was unsuccessful at the time of retrieval, in some cases the user terminal 100 becomes able to access the log management server 300 by the time the document is stored in a different (or the same) tray later. In such cases, the untransmitted log transmission unit 144 likewise transmits the log assigned to the document.

In this way, when the user terminal 100 is able to access the log management server 300, if an untransmitted log exists inside the document storage unit 130, or in other words if a document with an assigned log exists, the untransmitted log transmission unit 144 transmits the untransmitted log to the log management server 300. The transmission of an untransmitted log may be performed as soon as the untransmitted log transmission unit 144 discovers the untransmitted log (however, the transmission is limited to a time when the user terminal 100 is able to access the log management server 300). Also, rather than transmitting as soon as a log assigned to a document is discovered, at a timing when the user performs a retrieval or storage operation on the document, the untransmitted log transmission unit 144 may transmit a log of the operation together with the untransmitted log to the log management server 300.

Also, in the case in which the untransmitted log transmission unit 144 transmits a log assigned to a document to the log management server 300, the log removal unit 146 may also remove the log assigned to the document. This is because a log with the same content is recorded in the log management server 300, and therefore it is not necessary to keep the log together with the document on the user terminal 100 side. By this removal, the document stored in the document storage unit 130 is changed to a state without a corresponding log.

The transmission of a log assigned to a document (that is, an untransmitted log) to the log management server 300 is executed automatically by the user terminal 100 (particularly the log processing unit 140), but as another example, user confirmation may be sought when performing the transmission. User confirmation is sought to transmit untransmitted logs because some logs among the untransmitted logs may be of little or no usefulness even if recorded in the log management server 300. A log that is of little or no usefulness even if recorded is produced in cases such as when one of the users executing a flow of transferring a document through tray group accidentally transfers the document to the next user using a medium other than a tray, such as by email, for example.

For example, suppose that a document to be transferred through a tray is accidentally transferred by a first user to a second user through a medium other than a tray, such as email. Suppose that a log is assigned to the transferred document at this time, the second user receiving the document stores the document in the correct tray for transfer to a third user, and the third user retrieves the document from the tray. In this case, in the log assigned to the document retrieved by the third user, for example, there is a log record indicating that the first user retrieved the document from a first tray, followed by a log record indicating that the second user stored the document, in a third tray, followed by a log record indicating that the third user retrieved the document from the third tray. If the document had been transferred according to the correct procedure, the log would include a log record indicating that the first user stored the document in a second tray, but because of the procedural mistake by the first user, this log record is missing.

In situations where a large number of documents flow through the same transfer flow for certain business operations, in many cases logs are analyzed by performing statistical processing on the logs of the individual documents, such as in the case of analyzing the business operations. For example, the retention time of the document retained by each user as the document passes through the flow, the time taken by the overall flow, and the like are computed by statistical processing. However, a log that is missing relevant log cords may not be usable for such statistical processing. On the contrary, in the phase of analyzing the accumulated logs for a large number of documents, if a log with missing relevant log records is discovered, the burdensome work of going back through the log and investigating how the log records went missing may be produced. If the log with missing records was generated a long time before the time of analysis, such investigation may be difficult.

Accordingly, in the exemplary embodiment, in the case in which the user who is currently transferring the document discovers that a log record is missing from the log assigned to the document in this way, the user is able to give instruction for not transmitting the log to the log management server 300. If the user who is transferring the document according to a certain flow looks at the content of the log for the document, there is a high probability that the user will notice an abnormality such as a step missing from the log. In this way, by having the user who currently transferring the document discover an abnormality in the log and give an instruction for not transmitting the log to the log management server 300, there is a reduced possibility of discovering an abnormal log during the log analysis phase on the log management server 300 side, and the burdensome work of dealing with such an abnormal log may be avoided.

Figure 9:
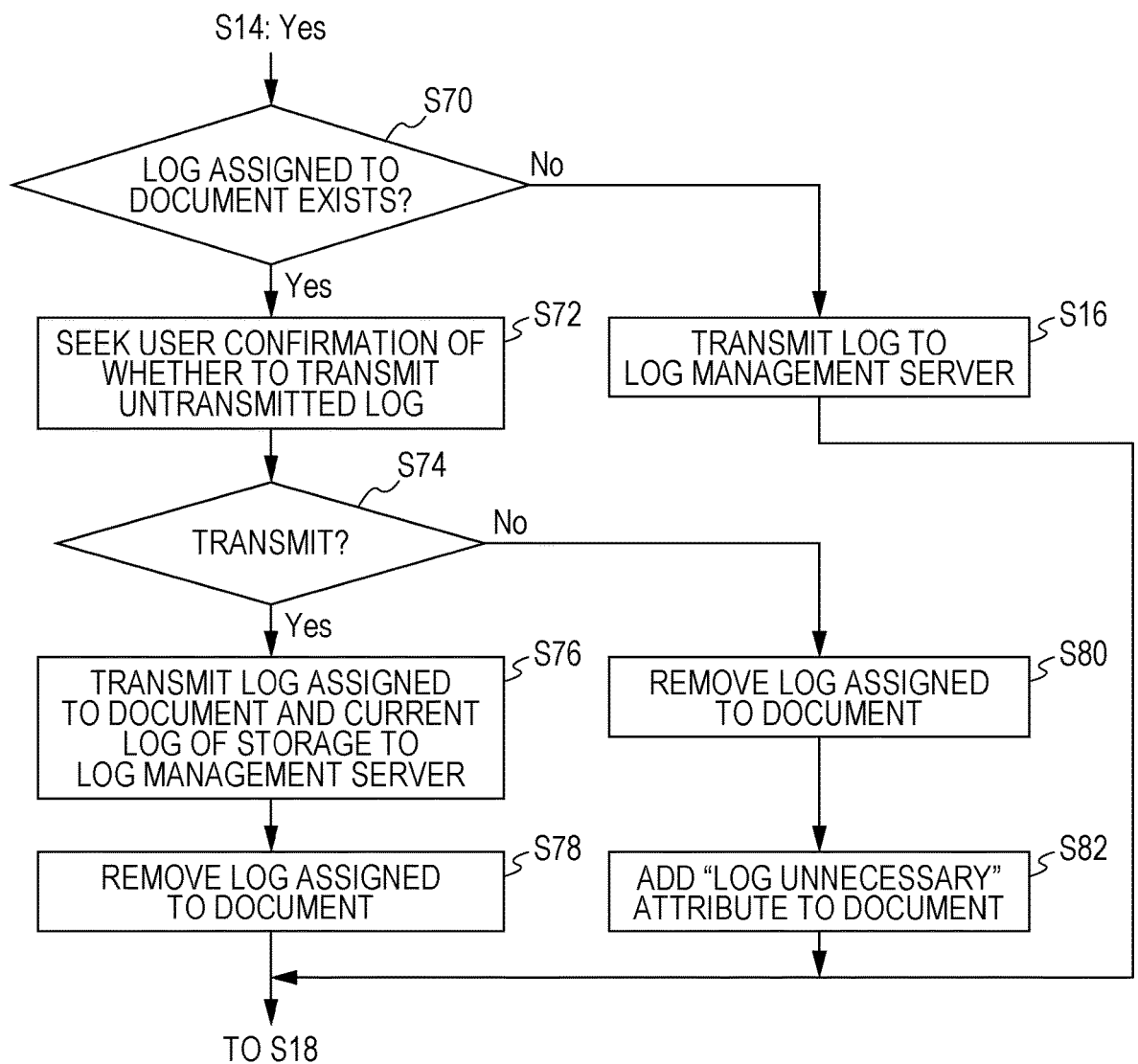
FIG. 9 is a diagram illustrating an example of a process of seeking user confirmation of whether to transmit an untransmitted log.

FIG. 9 illustrates an example of a process of seeking user confirmation of whether to transmit an untransmitted log. The example illustrated in FIG. 9 seeks user confirmation of whether to transmit an untransmitted log assigned to a document when an operation of storing the document in a tray is performed.

The procedure illustrated in FIG. 9 is a procedure inserted between S14 and S18 of the flowchart for when a document storage operation performed as illustrated in FIG. 5.

In the case of determining that accessing the log management server 300 is successful in S14 in response to an operation of storing a document by the user, the log processing unit 140 checks whether or not a log is assigned to the document in the document storage unit 130 (870). If the result of the determination is No, similarly to the procedure in FIG. 5, the log processing unit 140 transmits a log of the storage operation to the log management server 300 (S16) and proceeds to S18.

If the determination result in S70 is Yes, the log processing unit 140 causes the user terminal 100 to display a confirmation screen for seeking user confirmation of whether to transmit the log assigned to the document (in other words, the untransmitted log for the document) to the log management server 300 (S72).

FIG. 10 illustrates an example of such a confirmation screen 2200. On the confirmation screen 2200, a log content list 2202 including the untransmitted log, a message querying whether or not to transmit the untransmitted log to the server, and a button group for inputting a "Yes" or "No" response to the query are displayed. The log content list 2202 includes each log record included in the untransmitted log and the log record of the current storage operation. Also, in the content list 2202, the individual log records are arranged sequentially from the top in order of the time of operation. Also, on this display, tray names are displayed on the left edge of the list to make it easy to understand the movement of the document from tray to tray. The user looks at this content list 2202, checks whether an abnormality such as a missing log record exists, and takes the result of the check into consideration to judge whether or not to transmit the log to the log management server 300.

The log processing unit 140 determines whether or not the user's response to the confirmation screen 2200 is to transmit the log (that is, the user presses the "Yes" button) (S74). If the determination result of S74 is Yes, the untransmitted log transmission unit 144 transmits the log indicated by the content list 2202 to the log management server 300 (S76). In addition, the log removal unit 146 removes the log assigned to the document (S78). This is because once the log is transmitted to the log management server 300, it is no longer necessary to keep the log on the user terminal 100 side. After that, the process proceeds to S18.

A determination result of No in S74 means that the user has decided that it is not meaningful to accumulate the untransmitted log and the log of the current storage operation in the log management server 300. In this case, the log removal unit 146 removes the log assigned to the document (S80). If the log hypothetically is not removed at this point, the next user to whom the document is transferred may have to make a similar decision about the log again.

Figure 11:
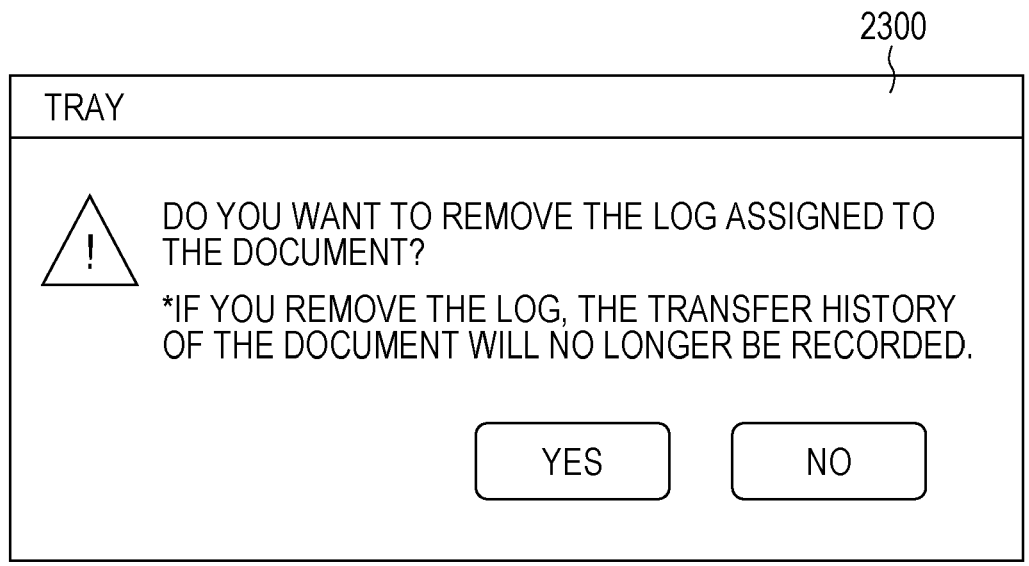
FIG. 11 is a diagram illustrating an example of a confirmation screen displayed when a user chooses not to transmit an untransmitted log.

Note that in the case in which the determination result of S74 is No, the log processing unit 140 may query the user about whether to remove the untransmitted log and the current log. An example of a screen 2300 used for this query is illustrated in FIG. 11. On the screen 2300, a message querying whether or not to remove the log assigned to the document, a cautionary explanation about removing the log, and "Yes" and "No" buttons for giving an instruction to remove the log or not are displayed. In the case in which the user is unable to decide by oneself whether to remove the log, the user presses "No". When the user presses "No", the log assignment unit 142 adds a log record indicating the current storage operation to the log assigned to the document. With this arrangement, the decision about whether to transmit the log assigned to the document to the log management server 300 is entrusted to the next user who receives the document.

After S80, the attribute assignment unit 148 adds an attribute indicating "log unnecessary" to the attribute information of the document. The "log unnecessary" attribute indicates that a log does not have to be recorded for the document with the assigned attribute. Although omitted from FIGS. 5 and 8, in the case in which the user performs an operation on a document, the log processing unit 140 first checks whether or not the document has the "log unnecessary" attribute, and if the document has the "log unnecessary" attribute, the log processing unit 140 grants permission to execute the operation to the tray processing unit 120 without performing any processing for the log. In this case, a log of the operation is not generated, and consequently a log is neither transmitted to the log management server 300 nor assigned to the document.

Such controls is performed because if one of the users has decided that it is not meaningful to accumulate a log of the document in the log management server 300, since the log is not transmitted to the log management server 300, it is useless to record a log of subsequent operations on the document.

The functions of the log processing unit 140 and the untransmitted log transmission unit 144 that display the content of a log assigned to a document to query the user about whether to transmit the log, and cause the log to be transmitted or not according to the query as exemplified above are one example of a transmission controller.

In the example of FIG. 9, when an operation of storing a document in a tray is performed, user confirmation about whether to transmit an untransmitted log assigned to the document is sought, but the timing of this confirmation may also be when a predetermined operation other than storage (for example, retrieval) is performed on the document. Also, the confirmation may be performed at a timing other than a timing when an operation is performed on the document.

The foregoing describes an example of a case in which the log management server 300 is on a different network from the document sharing server 150. However, even when both are on the same network, situations may occur in which a user terminal 100 is able to perform operations on a tray in the document sharing server 150, but is unable to send a log of the operations to the log management server 300. Consequently, the mechanism of the exemplary embodiment above has utility value even in the case in which the log management server 300 is on the same network the document sharing server 150.

Each user terminal 100 described above may be realized by causing a computer to execute a program expressing the functions of element groups forming the information processing device described earlier. Herein, the computer includes hardware having a circuit configuration in which a microprocessor such as a CPU, memory (first storage) such as random access memory (RAM) and read-only memory (ROM), a controller that controls a fixed storage device such as flash memory, a solid-state drive (SSD), or a hard disk drive (HDD), various input/output (I/O) interfaces, a network interface that controls connections to a network such as a local area network, and the like are interconnected via a bus or the like, for example. A program stating the processing content of each of these functions is saved to the fixed storage device such as flash memory via the network or the like, and installed in the computer. By having the CPU or other microprocessor load the program stored in the fixed storage device into RAM and execute the program, the function module group exemplified in the foregoing is realized.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
   a storage unit; and
   a processor programed to:
      generate a log of an operation for storing or retrieving data with respect to a storage area on a network, the log being generated responsive to the operation;
      responsive to communication with a log management server being unavailable to transmit the log:
         display a user interface requesting first user input to assign the log to the data in the storage unit;
         in response to receiving the first user input:
            in a case that the operation is for storing data, assign the log to the data and transmit the log and the data for storage in the storage area network;
            in a case that the operation is for retrieving data, retrieve the data and assign the log to the data;
      responsive to communication with the log management server becoming available after being unavailable:
         determine that the log is associated with the data; and
         responsive to the log being associated with the data, transmit the log to the log management server.

2. The information processing device according to claim 1, wherein the first user input is a first choice of storing the log in the storage unit in association with the data while communication with the log management server is unavailable, a second user input is a second choice of putting the information processing device in a communicable state with the log management server, and in a case in which communication with the log management server is unavailable and a user performs an operation of storing or retrieving the data with respect to the storage area, the processor causes the user to select between the first choice and the second choice.

3. The information processing device according to claim 2, wherein in a case in which the user selects neither of the first choice and the second choice, the processor causes a process of storage or retrieval corresponding to the operation not to be executed.

4. The information processing device according to claim 1, wherein the processor is further programed to in a case in which communication with the log management server is available and the log is stored in association with the data in the storage unit, display the log, query a user about whether or not to transmit the displayed log to the log management server, and transmit or not transmit the log to the log management server according to a response from the user with respect to the query.

5. The information processing device according to claim 2, wherein the processor is further programed to in a case in which communication with the log management server is available and the log is stored in association with the data in the storage unit, display the log, query the user about whether or not to transmit the displayed log to the log management server, and transmit or not transmit the log to the log management server according to a response from the user with respect to the query.

6. The information processing device according to claim 3, wherein the processor is further programed to in a case in which communication with the log management server is available and the log is stored in association with the data in the storage unit, display the log, query the user about whether or not to transmit the displayed log to the log management server, and transmit or not transmit the log to the log management server according to a response from the user with respect to the query.

7. The information processing device according to claim 4, wherein the processor is further programed to in a case in which the user responds to the query by indicating not to transmit the log to the log management server, assign an attribute indicating that a log is unnecessary to the data associated with the log, and in a case in which the attribute indicating that a log is unnecessary is assigned to the data, the processor does not generate a log for a new storage or retrieval operation with respect to the data.

8. The information processing device according to claim 4, wherein the processor is further programed to in a case in which the user responds to the query by indicating not to transmit the log to the log management server, remove the log stored in the storage unit.

9. The information processing device according to claim 7, wherein the processor is further programed to in a case in which the user responds to the query by indicating not to transmit the log to the log management server, remove the log stored in the storage unit.

10. The information processing device according to claim 1, wherein in a case in which communication with the log management server is available and an operation of storing or retrieving data with respect to the storage area is performed, the processor does not store a log of the operation in the storage unit.

11. The information processing device according to claim 2, wherein in a case in which communication with the log management server is available and an operation of storing or retrieving data with respect to the storage area is performed, the processor does not store a log of the operation in the storage unit.

12. The information processing device according to claim 1, wherein the processor is further programed to in a case in which the log stored in the storage unit is transmitted to the log management server, remove the log from the storage unit.

13. The information processing device according to claim 2, wherein the processor is further programed to in a case in which the log stored in the storage unit is transmitted to the log management server, remove the log from the storage unit.

14. The information processing device according to claim 1, wherein the processor encrypts the log before being stored in the storage unit in association with the data.

15. The information processing device according to claim 2, wherein the processor encrypts the log before being stored in the storage unit in association with the data.

16. The information processing device according to claim 1, wherein the processor causes stores the log to be stored in the storage unit as attribute information included in a file of the data.

17. The information processing device according to claim 2, wherein the processor stores the log in the storage unit as attribute information included in a file of the data.

18. A non-transitory computer readable medium storing a program causing a computer including a storage unit to execute a process for processing information, the process comprising:

generating a log of an operation for storing or retrieving data with respect to a storage area on a network, the log being generated responsive to the operation;

responsive to communication with a log management server being unavailable to transmit the log:
displaying a user interface requesting first user input to assign the log to the data in the storage unit;
in response to receiving the first user input:
in a case that the operation is for storing data, assigning the log to the data and transmit the log and the data for storage in the storage area network;
in a case that the operation is for retrieving data, retrieving the data and assign the log to the data;

responsive to communication with the log management server becoming available after being unavailable:
determining that the log is associated with the data; and
responsive to the log being associated with the data, transmitting the log to the log management server.

19. An information processing device comprising:
a storing means;
a controlling means for:
generating a log of an operation for storing or retrieving data with respect to a storage area on a network, the log being generated responsive to the operation;

responsive to communication with a log management server being unavailable to transmit the log:
- displaying, via a display means, a user interface requesting first user input to assign the log to the data in the storing means;
- in response to receiving the first user input:
  - in a case that the operation is for storing data, assigning the log to the data and transmit the log and the data for storage in the storage area network via a storage processing means;
  - in a case that the operation is for retrieving data, retrieving the data and assign the log to the data;

responsive to communication with the log management server becoming available after being unavailable:
- determining that the log is associated with the data; and
- responsive to the log being associated with the data, transmitting the log to the log management server via a transmitting means.

* * * * *